J. L. PURDY.
SAW FILING DEVICE.
APPLICATION FILED MAY 19, 1919.
1,342,462.
Patented June 8, 1920.
2 SHEETS—SHEET 2.
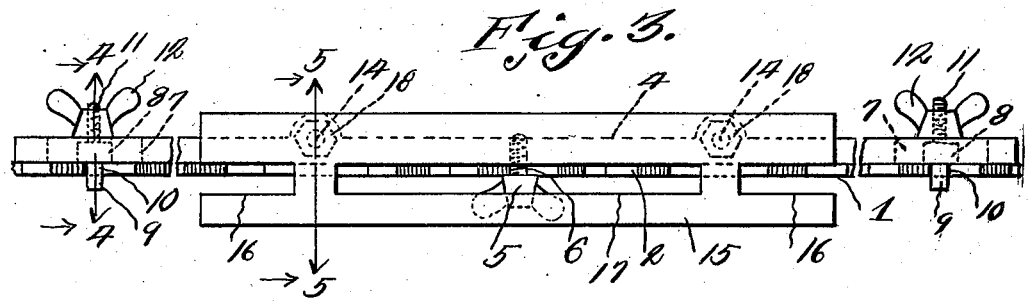
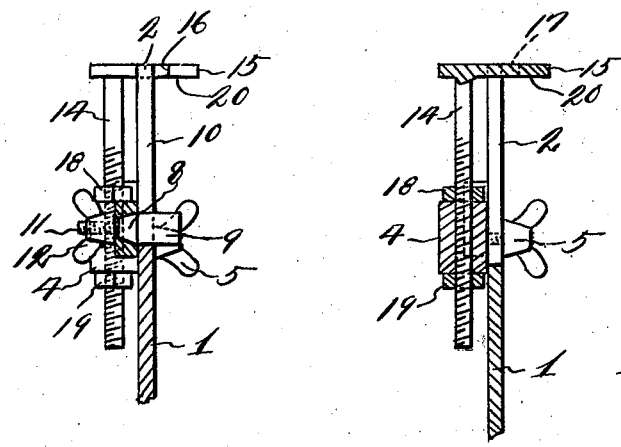
Inventor
J. L. Purdy
By D. Swift
Attorney

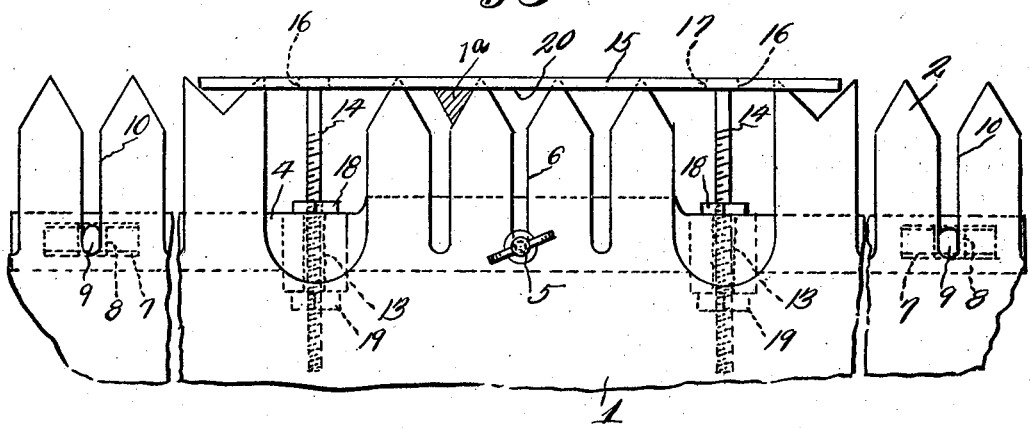
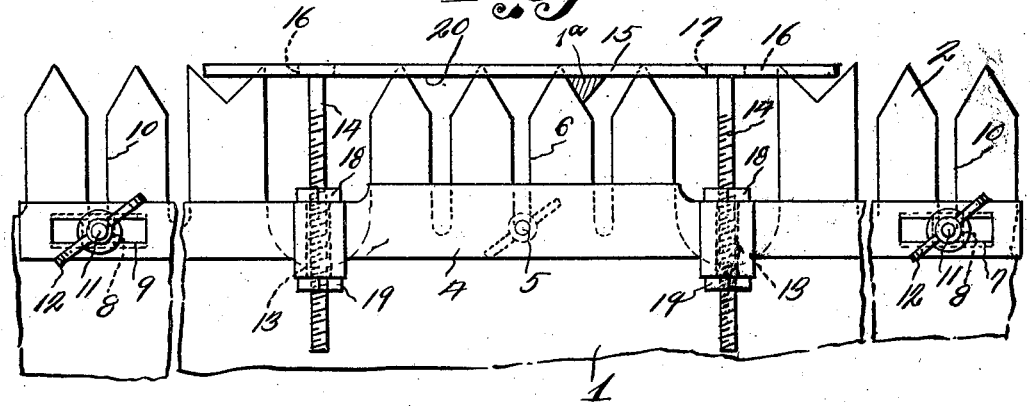

UNITED STATES PATENT OFFICE.

JAMES L. PURDY, OF UNION, WASHINGTON.

SAW-FILING DEVICE.

1,342,462.      Specification of Letters Patent.      Patented June 8, 1920.

Application filed May 19, 1919. Serial No. 298,009.

*To all whom it may concern:*

Be it known that I, JAMES L. PURDY, a citizen of the United States, residing at Union, in the county of Mason, State of Washington, have invented a new and useful Saw-Filing Device; and I do hereby declare the following to be a full, clear, and exact description of the invention, such as will enable others skilled in the art to which it appertains to make and use the same.

The invention relates to file guides and it has for its object to provide a guide of this character which may be easily, quickly and accurately secured to and adjusted to the teeth of a saw, thereby providing means for guiding the file during the filing operation of the teeth so that the teeth may be filed at a uniform angle.

A further object is to provide a file guide for saws, which comprises a bar adapted to be secured to the side of the teeth, said bar having means whereby the same may be adjusted and secured to various types of saws and to provide a vertically and angularly adjustable file guide adjustably secured to said bar.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of the toothed edge of a saw showing the file guide applied thereto.

Fig. 2 is a view similar to Fig. 1 but showing the other side of the saw and file guide.

Fig. 3 is a top plan view of the device.

Fig. 4 is a section taken on line 4—4 of Fig. 3.

Fig. 5 is a section taken on line 5—5 of Fig. 3.

Referring to the drawings, the numeral 1 designates a portion of a saw and 2 the teeth thereof, which teeth may be of various shapes or angles and may be cutting teeth or cleaning out teeth; however, these teeth are as a rule of the same angle, but where through constant filing of the same the angles become varied, such varying of the angles considerably reduces the efficiency of the saw. To overcome the above defect a file guide is provided which comprises a bar 4 which is adapted to be secured to the saw teeth by means of a thumb bolt 5 carried thereby, the shank of which bolt passes through one of the recesses 6 between the teeth. The ends of the bar 4 are provided with beveled elongated slots 7 having slidably mounted therein jamming blocks 8, said jamming blocks having extensions 9, which extensions are adapted to be received by recesses 10 between the teeth of the saw. The rear end of the jam blocks 8 have threaded extensions 11 on which are threaded thumb nuts 12 by the setting up on which the jam block 8 will be securely jammed in the bevel slots 7. The object of having the jam blocks slidably mounted in the elongated slots is to allow adjustment of the bar 4 to various types of saws which types vary in distance between centers between the teeth, also in distance between centers of spaces between the teeth.

Bar 4 is provided with vertically disposed apertures 13 and disposed in said apertures are upwardly extending threaded rods 14, the upper ends of which are connected by a file guide bar 15, which guide bar is provided with longitudinal slots 16 and 17, whereby the upward and downward adjustment of the guide plate 15 in relation to the teeth is effected so that said guide may be positioned downwardly, allowing the filing of the angle of the tooth at various positions along said angle. Lock nuts 18 and 19 are threaded on the rods 14, and are adapted to be rotated so that the guide plate 15 may be adjusted upwardly and downwardly, or if so desired at an angle. However the main function of the upward and downward adjustment and locking is to so adjust the file guide plate that the same will be in alinement with the points of the teeth.

When it is desired to file a saw the bar 4 is placed thereon and the thumb screw 5 screwed securely into the same, the lugs 9 having been previously adjusted and the thumb nuts 12 set up thereon. The bar 4 being securely fastened to the teeth, the nuts 18 and 19 are then manipulated so that the file guide is in proper alinement for guiding the file during the filing operation of the teeth; then a saw file 1ª which is usually triangular in cross section is placed in position so that one of its surface will engage the surface 20 of the guide 15, and a reciprocating movement imparted to said file, which action will cause the surface of the file which is at acute angle to the surface 20 of file guide to engage and file the tooth of the saw, this action being repeated on the various teeth and on both sides of the point thereof. The bar 15 is moved upwardly or downwardly according to the length of the tooth bevel or size of the file, this being necessary for the reason that saw files are considerably smaller than the length of the bevel of the teeth of large cross cut saws. When all the teeth that are under the file guide 15 have been filed the guide is moved so that the file guide will overlie other teeth. However, to accomplish this it will only be necessary to loosen the thumb bolt 5 and move the bar to another position.

Where the cutting points of a saw are semi-circular as for instance in circular saws, the file guide 15 may be formed on such an angle as to conform to the curvature of said saw.

The invention having been set forth what is claimed as new and useful is:—

1. A file guide for saws comprising a bar, means for securing said bar to the teeth of a saw, vertically adjustable rods carried by said bar and a file guide carried by the upper ends of said vertically adjustable rods.

2. A file guide comprising a bar, means centrally thereof for securing said bar to the teeth of a saw, horizontally adjustable lugs carried by the ends of said bar and adapted to be adjusted to register with and fit between teeth of the saw, a file guide having depending threaded rods, said threaded rods being disposed in vertical apertures of the bar and adjusting nuts threaded on said depending bars and disposed above and below said bar, said adjusting nuts forming means whereby the file guide may be adjusted upwardly and downwardly and locked to adjusted position, and longitudinal slots carried by the file guide allowing the guide to be adjusted downwardly below the points of the saw teeth.

3. A file guide comprising a bar, said bar having a set screw centrally thereof and adapted to be received between two of the teeth of a saw, elongated beveled slots at the ends of the bar, horizontally adjustable beveled jamming blocks disposed in said elongated slots, said jamming blocks having lugs adapted to engage between teeth of the saw, means for securely jamming the blocks in the beveled slots, vertically disposed rods passing through apertures in the bar, said rods having means whereby they may be adjusted and locked to various vertical positions, a file guide carried by the upper ends of the vertically disposed rods and elongated slots longitudinally disposed in the file guide plate for the reception of the teeth of the saw when the guide is adjusted downwardly.

In testimony whereof I have signed my name to this specification in the presence of two subscribing witnesses.

JAMES L. PURDY.

Witnesses:
C. C. HAUPTLY,
H. F. HAUPTLY.